Dec. 14, 1954     K. FRISCHMANN     2,696,755
RESILIENT SAFETY DEVICE FOR MICROSCOPES
Filed May 3, 1951
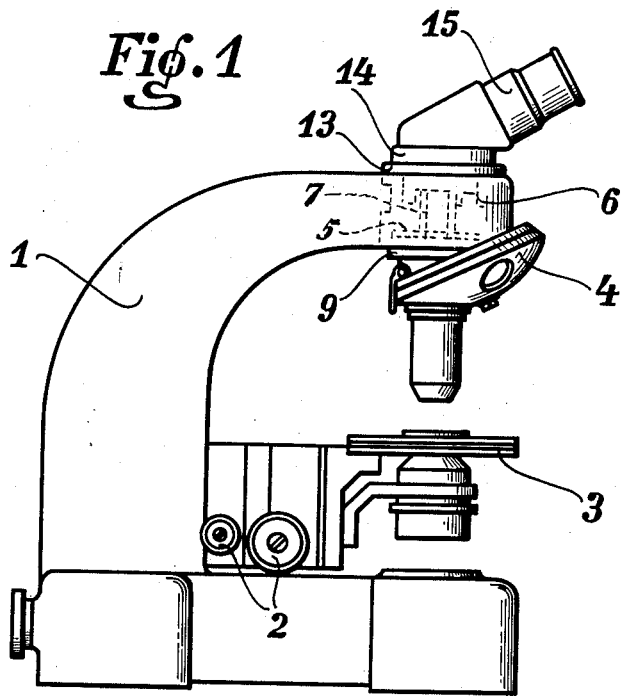
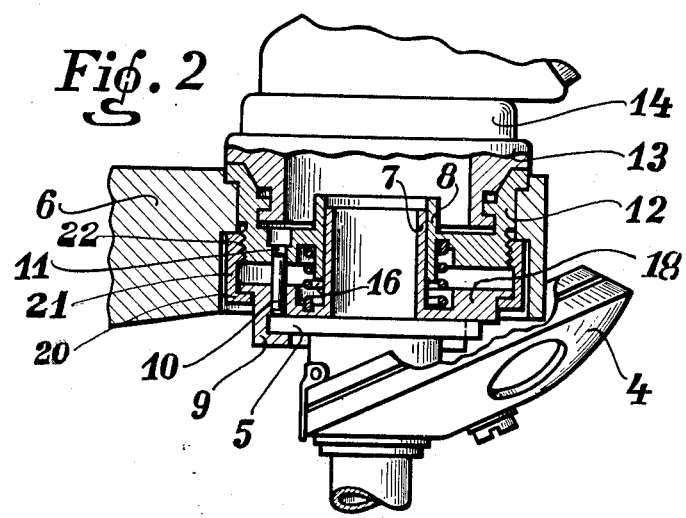

United States Patent Office 2,696,755
Patented Dec. 14, 1954

2,696,755
RESILIENT SAFETY DEVICE FOR MICROSCOPES

Karl Frischmann, Wetzlar-Garbenheim, Germany, assignor to Ernst Leitz, G. m. b. H., a corporation of Germany Application May 3, 1951, Serial No. 224,317

Claims priority, application Germany May 9, 1950

2 Claims. (Cl. 88—39)

The object of this invention is to provide a resilient safety device for microscopes to prevent possible damage to the microscope objective and to the object under examination when the objective is focused. It has heretofore been proposed to include certain stop devices in the focusing mechanism on microscopes or a friction clutch means on the adjusting knobs to resist the pressure on the object when the objective is focused. Other devices for the same purpose have been proposed, see for example the French Patent No. 814,272 in which a microscope is guided in a sliding carriage on the microscope stand. This has the disadvantage that the entire weight of the microscope tube bears down upon the object if the adjustable stage happens to contact the objective.

The present invention proposes a resilient safety device interposed between the microscope tube and the microscope objective. The device is mounted in the microscope supporting stand. Specifically, this device is in the form of an annular bearing in which an objective carrier is slidably supported in non-rotatable relation. A spring is provided to press the objective carrier downward to its lowermost position. The spring power is calculated so that when the objective contacts the object, the resistance of the object is overcome without any damage resulting from such contact. The principle underlying the invention is that, that the least possible mass is to be elevated.

In the accompanying drawing illustrating the invention Fig. 1 is a side view of a microscope embodying the invention. Fig. 2 is a sectional detail view of the safety device with parts broken away.

Figure 1 shows a microscope having the supporting stand 1 and the knobs 2 for elevating the stage 3. The stand forms a supporting arm 6. The rotatable objective carrier is indicated at 4 and is provided with a dovetail 5 which slides and is insertable in a dovetail guide 9 which is complementary to the part 5 as will be understood.

The dovetail guide 9 is formed in the base 18 of a sleeve 7 which is slidably supported in the annular bearing 8. The sleeve is prevented from rotating within the bearing by means of one or more pins 10 which are fixed in the base 18 and extend into holes 11 in the base 12 of the bearing 8. The base 12 of the bearing 8 extends upwardly, as shown, for a dovetail connection with the base 13 of the ocular carrier 14, the ocular being shown at 15. The parts 8—12 are inserted in the microscope arm 6 from above. The parts 18—7—9 form a lower member and are inserted in the arm 6 from below. The base 18 rests upon an inturned flange 20 of a threaded nipple 21 which is screwed upon the base 12 as at 22 and whereby the base 12 is secured in the arm 6 and the said upper and lower parts are united within the arm to form a safety device between the microscope tube and the objective. The upper part is provided with means, as shown, for detachably connecting the ocular 15. The lower part detachably carries the objective carrier 4 which is axially slidably supported in the bearing 8 and nipple 21. The latter has a head 13 which supports the ocular 15 by means of a known dovetail arrangement 14, not shown in detail.

A cylindrical helical spring 16 is interposed between the base 12 of the bearing 8 and the base 18 of the slidable sleeve 7, the ends of the spring being fixed in the parts 8 and 7, respectively, as shown. The power of the spring is so calculated that when the objective contacts the object, the objective carrier 4 will yield upwardly to the pressure. Inasmuch as the pin or pins 10 are made to slide freely in the holes 11, the latter are made somewhat wider and the spring is so constructed that its torsional force presses the pins against the walls of the holes 11 for better guidance and operation.

When the stage 3 with an object thereon is elevated and the object contacts the objective, the latter, the sleeve 7 and the guide 9 will yield under the spring pressure and as said above, the parts are so calculated that no damage is inflicted upon either the objective or the object.

I claim:
1. In a microscope having a microscope ocular tube and a microscope objective, a safety device interposed between said tube and said objective for preventing damaging contact between the objective and an object under examination when the objective is focused upon the object, said microscope having a lateral arm provided with a substantially vertically disposed aperture therethrough, said safety device comprising an upper member inserted in said aperture from above the same, a lower member inserted in said aperture from below the same, a nipple rotatably carried by said lower member and threadedly engaging said upper member to unite the said two members and unite said upper member with the said microscope arm, means in the upper member for detachably securing the ocular tube thereto, means in the lower member for detachably securing the objective thereto, said lower member being axially slidably supported within the said nipple and a spring within said nipple between the said upper and lower members for providing elastic contact between the objective and the object when the objective contacts the object during the focusing operation.

2. In a microscope having a stand, a supporting arm raising therefrom, the upper outer end of the arm being parallel to the top of the stand, said arm being provided at its free end with a substantially vertically disposed aperture therethrough, an upper member mounted in the upper portion of the aperture in the arm, a microscope ocular tube mounted in said upper member, said upper member having an annular bearing in the center thereof and threads on the lower periphery thereof, a lower member having an inner shoulder for carrying the objective carrier and an outer peripheral shoulder, a threaded nipple which engages said outer shoulder and which engages the lower threaded portion of the upper member, the lower member having a sleeve on its upper inner portion slidable into the annular bearing of the upper member, said upper and lower members engaging a supporting formation in the arm, a tensioning member inserted between the upper and lower members and a pin projecting vertically between the upper and lower members, said pin and tensioning member forming a non-rotatable and slidable contact between the upper member and the lower member when pressure is exerted on the lower member when the object and the objective contact during the focusing operation.

References Cited in the file of this patent
UNITED STATES PATENTS

| Number | Name | Date |
|---|---|---|
| 775,934 | Patterson | Nov. 29, 1904 |
| 1,996,920 | Hauser | Apr. 9, 1935 |
| 2,216,943 | Hanemann | Oct. 8, 1940 |
| 2,530,352 | Gallasch | Nov. 14, 1950 |
| 2,533,371 | Heine | Dec. 12, 1950 |